United States Patent
Murakami et al.

(10) Patent No.: US 11,686,617 B2
(45) Date of Patent: Jun. 27, 2023

(54) OPTICAL SPECTRUM ANALYZER AND PULSE-MODULATED LIGHT MEASUREMENT METHOD

(71) Applicant: ANRITSU CORPORATION, Kanagawa (JP)

(72) Inventors: Taichi Murakami, Kanagawa (JP); Tomohide Yamazaki, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 17/650,877

(22) Filed: Feb. 14, 2022

(65) Prior Publication Data
US 2022/0307900 A1   Sep. 29, 2022

(30) Foreign Application Priority Data

Mar. 29, 2021   (JP) .............................. JP2021-055788
Mar. 29, 2021   (JP) .............................. JP2021-055789

(51) Int. Cl.
*G01J 3/18*   (2006.01)
*G01M 11/00*   (2006.01)
*G01J 3/02*   (2006.01)

(52) U.S. Cl.
CPC ............... *G01J 3/18* (2013.01); *G01J 3/0205* (2013.01); *G01M 11/333* (2013.01)

(58) Field of Classification Search
CPC .......... G01J 3/18; G01J 3/0205; G01J 3/0237; G01J 3/0264; G01J 3/021; G01J 3/0216; G01M 11/333
See application file for complete search history.

(56) References Cited

U.S. PATENT DOCUMENTS

2015/0092192 A1*   4/2015   Forster .................. G01J 3/0205
                                                          356/402
2022/0236416 A1*   7/2022   Takahashi ............... G01S 17/26

FOREIGN PATENT DOCUMENTS

| JP | 2564009 Y2 | 3/1998 | | |
| JP | 3986031 B2 | 10/2007 | | |
| WO | WO-2013066896 A1 | * | 5/2013 | .............. G01J 3/021 |
| WO | WO-2015177974 A1 | * | 11/2015 | ................ G01J 3/18 |

* cited by examiner

*Primary Examiner* — Tarifur R Chowdhury
*Assistant Examiner* — Carlos Perez-Guzman
(74) *Attorney, Agent, or Firm* — Pearne & Gordon, LLP

(57) ABSTRACT

Provided are an optical spectrum analyzer and a pulse-modulated light measurement method capable of measuring pulse-modulated light even when a pulse-on time and a pulse period of the pulse-modulated light are unknown. Pulse-modulated light (DUT) is incident on a diffraction grating 3. A first light receiving unit 8 receives the 0th-order light of diffracted light diffracted by the diffraction grating 3. A second light receiving unit 7 receives diffracted light of an order other than the 0th-order light. A measurement timing signal generation unit 9 generates a sampling signal based on the 0th-order light received by the first light receiving unit. The spectrum of the diffracted light received by the second light receiving unit is measured based on the sampling signal generated by the measurement timing signal generation unit.

9 Claims, 4 Drawing Sheets

OPTICAL SPECTRUM ANALYZER AND PULSE-MODULATED LIGHT MEASUREMENT METHOD

TECHNICAL FIELD

The present invention relates to an optical spectrum analyzer and a pulse-modulated light measurement method.

BACKGROUND ART

In the related art, an optical spectrum analyzer as disclosed in, for example, Patent Document 1, has been used to measure a wavelength component contained in a light under test, is a measurement target (DUT: device under test).

The optical spectrum analyzer selectively can receive each wavelength component contained in the light under test by using an optical filter that has high wavelength selectivity and is capable of changing the selected wavelength. Then, the optical spectrum analyzer can measure the spectrum distribution in a wavelength-axis direction and the like and display the result on a screen.

The optical spectrum analyzer in Patent Document 1 discloses a technique for avoiding an optical loss due to a beam splitter in the middle of an optical path in an apparatus.

Meanwhile, the measurement target of the optical spectrum analyzer is generally light of continuous wave (CW). However, when a DUT such as a laser diode (LD) chip or a module is caused to continuously emit light, for example, it is estimated that the emission wavelength and the emission level are changed over time due to an influence of a temperature change caused by causing a current for driving the DUT to continuously flow. Therefore, in order to suppress the change in wavelength and level due to temperature changes, a method in which a light source is subjected to pulse modulation (periodic on/off of light emission) to intermittently emit light in a pulsed manner.

Further, when the pulsed light is emitted from the light source, it is possible to detect the state of a target by measuring the reflected light reflected by the target. For example, in a light detection and ranging (LiDAR (Laser Imaging Detection and Ranging)) technology, it is possible to measure the scattered light with respect to irradiation with laser emitted in a pulsed manner, and analyze the distance to a target at a long distance and the properties of the target.

A spectroscopic analyzer disclosed in Patent Document 2 has been proposed as an optical spectrum analyzer capable of measuring the optical spectrum of such pulsed light (pulse-modulated light).

RELATED ART DOCUMENT

Patent Document

[Patent Document 1] Japanese Patent No. 3986031
[Patent Document 2] Japanese Registered Utility Model No. 2564009

DISCLOSURE OF THE INVENTION

Problem that the Invention is to Solve

However, the spectroscopic analyzer disclosed in Patent Document 2 does not include a function/method of detecting the pulse-on time and pulse period of the pulse-modulated light when the pulse-on time and the pulse period are unknown. Thus, there is a problem that, when the pulse-on time and the pulse period are unknown, it is not possible to adjust a sampling timing and to measure a peak level.

The present invention has been made in view of the above circumstances, and an object of the present invention is to provide an optical spectrum analyzer and a pulse-modulated light measurement method capable of measuring a peak level for each wavelength of pulse-modulated light even when a pulse-on time and a pulse period of pulse-modulated light are unknown.

Means for Solving the Problem

In order to achieve the above-described object, an optical spectrum analyzer and a pulse-modulated light measurement method according to the present invention are characterized by [1] to [9] as follows.

[1]

There is provided an optical spectrum analyzer that measures pulse-modulated light. The optical spectrum analyzer includes a diffraction grating (3) on which pulse-modulated light is incident, a first light receiving unit (8) that receives 0th-order light of diffracted light diffracted by the diffraction grating (3), a second light receiving unit (7) that receives the diffracted light of an order other than the 0th-order light, a measurement timing signal generation unit (9) that generates a sampling signal based on the 0th-order light received by the first light receiving unit, and an optical spectrum signal detection unit (10) that measures a spectrum of the diffracted light received by the second light receiving unit, based on the sampling signal generated by the measurement timing signal generation unit.

[2]

In the optical spectrum analyzer described in [1], the measurement timing signal generation unit determines a hold timing, a reset timing, and a sampling timing based on the 0th-order light received by the first light receiving unit. The optical spectrum analyzer further includes a peak hold circuit (102) that holds a peak of the diffracted light of the order other than the 0th-order light, which is received by the second light receiving unit during a period from the hold timing to the reset timing, and a sampling unit (103) that samples the peak held by the peak hold circuit (102) in accordance with the sampling timing.

[3]

The optical spectrum analyzer described in [2] further includes a switching unit (104) that switches an input to the sampling unit between the peak hold circuit and the second light receiving unit.

[4]

The optical spectrum analyzer described in [2] further includes a return mirror (4) on which the diffracted light from the diffraction grating is incident and reflected again toward the diffraction grating. The first light receiving unit receives the 0th-order light diffracted first by the diffraction grating, and the second light receiving unit receives the diffracted light of the order other than the 0th-order light, which is diffracted again by the diffraction grating.

[5]

There is provided a pulse-modulated light measurement method. The pulse-modulated light measurement method includes causing the pulse-modulated light to be incident on a diffraction grating (3) to emit diffracted light, determining a hold timing, a reset timing, and a sampling timing based on 0th-order light of the diffracted light, holding a peak of the diffracted light of the order other than the 0th-order light during a period from the hold timing to the reset timing, and sampling the peak in accordance with the sampling timing.

[6]

In the optical spectrum analyzer described in [1], the measurement timing signal generation unit detects a peak timing at which the 0th-order light received by the first light receiving unit becomes a peak. The optical spectrum analyzer further includes a sampling unit (108) that samples the diffracted light of the order other than the 0th-order light, which is received by the second light receiving unit at the peak timing.

[7]

The optical spectrum analyzer described in [6] further includes a delay circuit (107) that delays the diffracted light of the order other than the 0th-order light, which is received by the second light receiving unit. The sampling unit samples the diffracted light of the order other than the 0th-order light, which is delayed by the delay circuit.

[8]

The optical spectrum analyzer described in [6] further includes a return mirror (4) on which the diffracted light from the diffraction grating is incident and reflected again toward the diffraction grating (3). The first light receiving unit receives the 0th-order light diffracted first by the diffraction grating, and the second light receiving unit receives again the diffracted light of the order other than the 0th-order light, which is diffracted again by the diffraction grating.

[9]

There is provided a pulse-modulated light measurement method. The pulse-modulated light measurement method includes causing the pulse-modulated light to be incident on a diffraction grating (3) to emit diffracted light, detecting a peak timing of 0th-order light of the diffracted light, and sampling the diffracted light of the order other than the 0th-order light at the detected peak timing.

According to the optical spectrum analyzer having the configuration in [1] described above, the sampling signal is generated based on the 0th-order light. Thus, even when the pulse-on time and the pulse period of the pulse-modulated light are unknown, it is possible to measure the peak level for each wavelength of the pulse-modulated light.

According to the optical spectrum analyzer and the pulse-modulated light measurement method having the configurations in [2] and [5] described above, the hold timing, the reset timing, and the sampling timing are determined based on the 0th-order light. Thus, even when the pulse-on time and the pulse period of the pulse-modulated light are unknown, it is possible to measure the optical peak level for each wavelength of the pulse-modulated light.

According to the optical spectrum analyzer having the configuration in [3] described above, the sampling unit can selectively sample both the peak held by the peak hold circuit and the diffracted light of the order other than the 0th-order light, which is received by the second light receiving unit.

According to the optical spectrum analyzer having the configuration in [4] described above, it is possible to cause the first light receiving unit to receive the 0th-order light while the second light receiving unit receives the diffracted light of the order other than the 0th-order light.

According to the optical spectrum analyzer and the pulse-modulated light measurement method having the configurations in [6] and [9] described above, the diffracted light of the order other than the 0th-order light is sampled at the peak timing of the 0th-order light. Thus, even when the pulse-on time and the pulse period of the pulse-modulated light are unknown, it is possible to measure the optical peak level for each wavelength of the pulse-modulated light.

According to the optical spectrum analyzer having the configuration in [7] described above, it is possible to accurately measure the optical peak level for each wavelength of the pulse-modulated light.

According to the optical spectrum analyzer having the configuration in [8] described above, it is possible to cause the first light receiving unit to receive the 0th-order light while the second light receiving unit receives the diffracted light of the order other than the 0th-order light.

Advantage of the Invention

According to the present invention, it is possible to provide an optical spectrum analyzer and a pulse-modulated light measurement method capable of measuring a peak level for each wavelength of pulse-modulated light even when the pulse-on time and the pulse period of the pulse-modulated light are unknown.

The present invention has been briefly described above. Further, the details of the present invention will be further clarified by reading through forms (referred to as "embodiments" below) for embodying the invention below with reference to the accompanying drawings.

BEST MODE FOR CARRYING OUT THE INVENTION

Specific embodiments of the present invention will be described below with reference to the respective drawings.

First Embodiment

Figure 1:
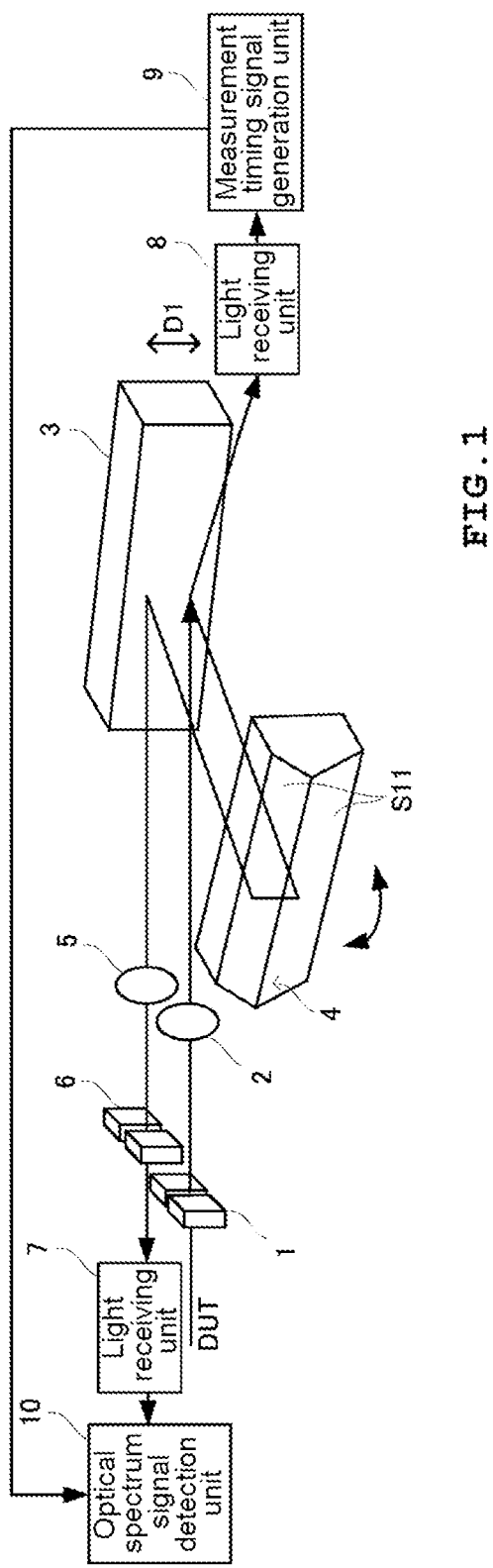
FIG. 1 is a configuration diagram illustrating a configuration example of an optical spectrum analyzer according to an embodiment of the present invention.

FIG. 1 illustrates a configuration example of an optical spectrum analyzer OSA according to an embodiment of the present invention. The optical spectrum analyzer OSA in the present embodiment can measure pulse-modulated light DUT as a measurement target.

Figure 2:
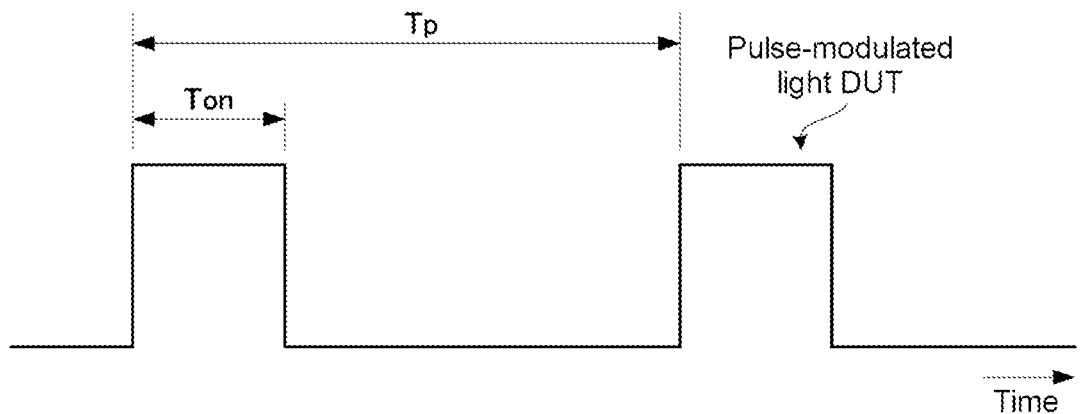
FIG. 2 is a time chart illustrating an example of pulse-modulated light.

The pulse-modulated light DUT used as the measurement target by the optical spectrum analyzer OSA in the present embodiment periodically performs switching between ON and OFF of optical power, for example, as with a waveform illustrated in FIG. 2. That is, an optical signal is intermittently generated in a pulse shape. Such a pulse-modulated light DUT suppresses heat generation of a light source to be useful of stabilizing an emission wavelength and an emission level.

A case where the pulse modulation frequency of such pulse-modulated light DUT is relatively low of about several tens of Hz to several MHz is assumed. That is, the optical spectrum analyzer OSA in the present embodiment handles signal light which is pulse-modulated at a low frequency at which an operation thereof can be performed, as the measurement target.

As illustrated in FIG. 1, the optical spectrum analyzer OSA in the present embodiment includes an incident slit 1, a collimator 2, a diffraction grating 3, a corner mirror (return mirror) 4, a condenser 5, an exit slit 6, a light receiving unit (second light receiving unit) 7, a light receiving unit (first light receiving unit) 8, a measurement timing signal generation unit (timing determination unit) 9, and an optical spectrum signal detection unit 10. The pulse-modulated light DUT being a measurement target is incident on the incident slit 1. The collimator 2 is a lens in which the pulse-modulated light DUT incident through the incident slit 1 is made to be parallel light.

The parallel light from the collimator 2 is incident on the diffraction grating 3. The diffraction grating 3 is formed by arranging a plurality of fine grooves along an engraving direction D1. When the parallel light from the collimator 2 is incident, the diffraction grating 3 generates diffracted light including 0th-order light in which all wavelengths are directed in the same direction, and nth-order (n is an integer other than 0) light enhanced in a different direction for each wavelength, by a diffraction phenomenon.

In the corner mirror 4, the nth-order light is incident, and the incident nth-order light is reflected again toward the diffraction grating 3. The condenser 5 collects light emitted in a specific direction among rays of the nth-order light diffracted again by the diffraction grating 3. The exit slit 6 is provided at a condensing position of the condenser 5, and emits light having a wavelength emitted in the specific direction. By rotating the corner mirror 4 around a rotation axis along the engraving direction D1, it is possible to adjust the wavelength of the light emitted from the diffraction grating 3 in the specific direction (that is, emitted toward the condenser 5), and to select the wavelength of the light incident on the condenser 5.

The light receiving unit 7 receives the nth-order light that has passed through the exit slit 6 and performs photoelectric conversion. The light receiving unit 8 receives the 0th-order light diffracted first by the diffraction grating 3 and performs photoelectric conversion.

The measurement timing signal generation unit 9 is configured by, for example, a microcomputer and generates a hold signal, a reset signal, and a sampling signal based on the 0th-order light received by the light receiving unit 8. The hold signal, the reset signal, and the sampling signal are provided for determining a hold timing and a reset timing of a peak hold circuit 102 described later and a sampling timing of an A/D converter 103. Then, the measurement timing signal generation unit 9 transmits the generated hold signal, reset signal, and sampling signal to the optical spectrum signal detection unit 10 described later. The details of the measurement timing signal generation unit 9 will be described later.

Figure 3:
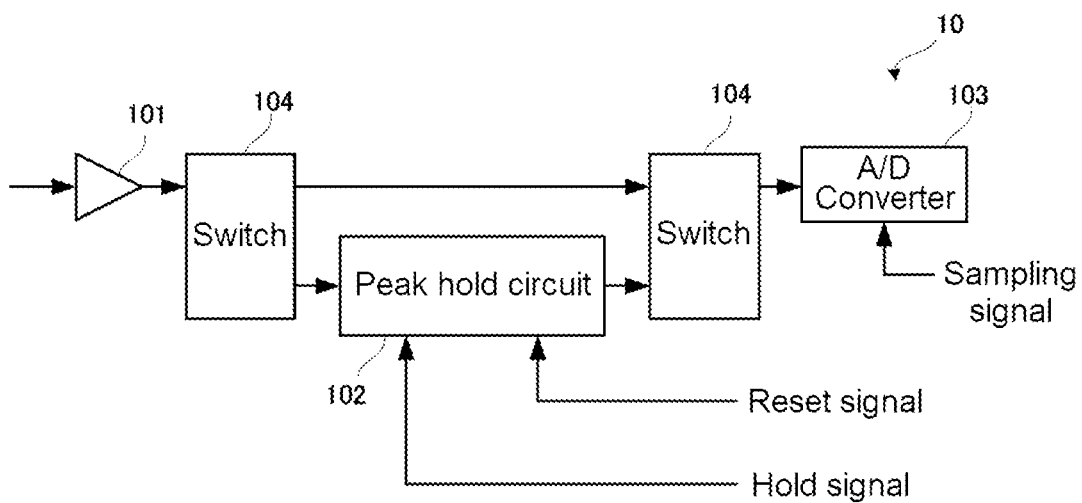
FIG. 3 is a configuration diagram illustrating an optical spectrum signal detection unit according to a first embodiment.

The optical spectrum signal detection unit 10 measures the spectrum from the nth-order light received by the light receiving unit 7. As illustrated in FIG. 3, the optical spectrum signal detection unit 10 includes a signal amplifier 101, the peak hold circuit 102, the A/D converter (sampling unit) 103, and a switch (switching unit) 104. The signal amplifier 101 amplifies the signal of the nth-order light that has been received by the light receiving unit 7 and then photoelectrically converted. The peak hold circuit 102 is a circuit that holds the peak of the signal of the nth-order light during a period from when the hold signal is input until the reset signal is input. Each time the sampling signal is input, the A/D converter 103 performs analog-to-digital conversion by sampling the signal of the peak held by the peak hold circuit 102 or the signal of the nth-order light. The switch 104 switches the input to the A/D converter 103 between the signal of the peak held by the peak hold circuit 102 and the signal of the nth-order light photoelectrically converted by the light receiving unit 7.

Figure 4:
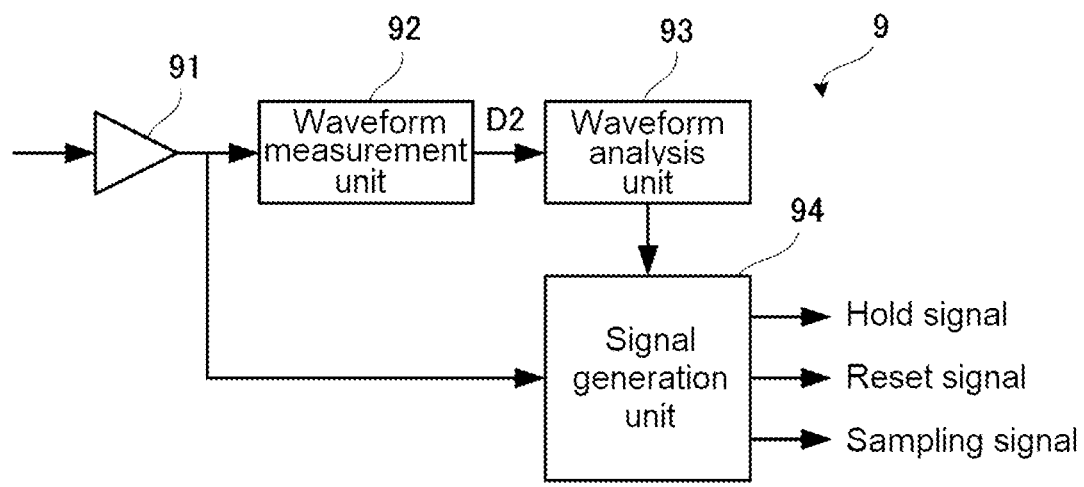
FIG. 4 is a configuration diagram illustrating a measurement timing signal generation unit in the first embodiment.

Next, the details of the measurement timing signal generation unit 9 described above will be described. As illustrated in FIG. 4, the measurement timing signal generation unit 9 includes a signal amplifier 91, a waveform measurement unit 92, a waveform analysis unit 93, and a signal generation unit 94. The signal amplifier 91 amplifies the signal of the 0th-order light that has been received and then photoelectrically converted by the light receiving unit 8. The waveform measurement unit 92 repeatedly samples the amplified signal of the 0th-order light at regular intervals and sequentially acquires an optical power measurement value for each time. The sampling frequency in this case is, for example, 1 MHz. That is, the signal level of the 0th-order light photoelectrically converted by the light receiving unit 8 is sampled every 1 μsec in the sampling circuit in the waveform measurement unit 92, and a digital value obtained by an A/D converter in the waveform measurement unit 92 converting the signal level is input to the waveform analysis unit 93. Thus, by repeating sampling 1000 times in a cycle of, for example, 1 μsec, data D2 of the optical power measurement values of 1000 points in a time axis direction can be input to the waveform analysis unit 93.

The waveform analysis unit 93 obtains an off-to-on rising timing, an on-to-off fall timing, a pulse-on time Ton, and a pulse period Tp of the pulse-modulated light DUT based on the data of the optical power measurement value for each time. That is, since the data D2 of the optical power measurement value for each time, which is obtained by the waveform measurement unit 92, represents the waveform of the pulse-modulated light DUT as illustrated in FIG. 2, for example, it is possible to detect the rising timing, the falling timing, the pulse-on time Ton, the pulse period Tp, and the like of the pulse-modulated light DUT, based on such a waveform.

Then, the signal generation unit 94 can perform switching between a peak measurement mode and a normal measurement mode. In the peak measurement mode, the signal generation unit 94 generates a hold signal, a reset signal, and a sampling signal based on the rising timing, the falling timing, the pulse-on time Ton, the pulse period Tp, and the like detected by the waveform analysis unit 93. The hold signal and the reset signal are set so that the peak hold circuit 102 can hold a peak for each pulse. Specifically, the signal generation unit 94 generates the hold signal that has a Hi level for a predetermined time in synchronization with the rising timing of the pulse-modulated light DUT.

The signal generation unit 94 generates the reset signal having a Hi level at a timing immediately before the rising of the pulse-modulated light DUT. The timing immediately before the rising can be obtained from the rising timing, the falling timing, the pulse-on time Ton, and the pulse period Tp, which have been detected. Further, the signal generation unit 94 generates the sampling signal having a Hi level for a predetermined time after the falling timing and before the reset signal is output.

The signal generation unit 94 generates the sampling signal having a Hi level at a predetermined cycle in the normal measurement mode.

Next, the operation of the optical spectrum analyzer OSA having the above-described configuration will be described. First, in the peak measurement mode, the optical spectrum signal detection unit 10 controls the switch 104 to connect the peak hold circuit 102 between the signal amplifier 101 and the A/D converter 103. Thus, the signal of the peak held by the peak hold circuit 102 is input to the A/D converter 103. In the peak measurement mode, the measurement timing signal generation unit 9 generates the above-described hold signal, reset signal, and sampling signal. Thus, it is possible to detect the optical peak level of the signal of the nth-order light by the A/D converter 103 while the pulse-modulated light DUT is on. In the peak measurement mode, when the corner mirror 4 is rotated to sequentially switch the wavelengths incident on the condenser 5, the optical spectrum signal detection unit 10 can detect the optical peak level for each wavelength.

Further, in the normal measurement mode, the optical spectrum signal detection unit 10 controls the switch 104 to disconnect the peak hold circuit 102 from the signal amplifier 101 and the A/D converter 103, and to directly connect the signal amplifier 101 and the A/D converter 103 to each other. Thus, the signal of the nth-order light photoelectrically converted by the light receiving unit 7 is input to the A/D converter 103. Further, in the normal measurement mode, the measurement timing signal generation unit 9 generates only the above-described sampling signal. Thus, it is possible to detect the optical level of the nth-order light of the DUT by the A/D converter 103. In the normal measurement mode, when the corner mirror 4 is rotated to sequentially switch the wavelength incident on the condenser 5, the optical spectrum signal detection unit 10 can acquire data of the optical power distribution on a frequency axis. Further, the optical spectrum signal detection unit 10 can acquire the emission wavelength and the spectrum width of the DUT from the optical power distribution.

According to the above-described embodiment, the measurement timing signal generation unit 9 generates the hold signal, the reset signal, and the sampling signal based on the 0th-order light. Thus, even when the pulse-on time and the pulse period of the pulse-modulated light DUT are unknown, it is possible to measure the optical peak level for each wavelength of the pulse-modulated light DUT.

According to the above-described embodiment, the switch 104 can switch the input to the A/D converter 103 between the peak held by the peak hold circuit 102 and the nth-order light received by the light receiving unit 7. Thus, the A/D converter 103 can selectively sample both the peak held by the peak hold circuit 102 and the nth-order light received by the light receiving unit 7.

According to the above-described embodiment, the nth-order light diffracted again by the diffraction grating 3 is incident on the light receiving unit 7, and the 0th-order light first diffracted by the diffraction grating 3 is incident on the light receiving unit 8. Thus, the light receiving unit 8 can receive the 0th-order light while the light receiving unit 7 receives the nth-order light.

The present invention is not limited to the above-described embodiment, and can be appropriately modified, improved, and the like. In addition, the material, shape, dimensions, number, arrangement location, and the like of each component in the above-described embodiment have any values as long as the present invention can be achieved, and are not limited.

According to the above-described embodiment, the 0th-order light diffracted first by the diffraction grating 3 is incident on the light receiving unit 8, but the light receiving unit 8 is not limited to this. The light receiving unit 7 may function as a first light receiving unit and a second light receiving unit so that the 0th-order light is incident on the light receiving unit 7. In this case, the 0th-order light is first incident on the light receiving unit 7, the pulse-on time Ton and the pulse period Tp are obtained, and then the nth-order light is incident on the light receiving unit 7.

Second Embodiment

An optical spectrum analyzer according to a second embodiment is different from that in the first embodiment in the configurations and operations of the measurement timing signal generation unit 9 and the optical spectrum signal detection unit 10, and the other configurations are common to the first embodiment.

Therefore, the configurations other than the measurement timing signal generation unit 9 and the optical spectrum signal detection unit 10 are based on the description of the first embodiment, and the description thereof will be omitted.

In the second embodiment, the measurement timing signal generation unit 9 is configured by, for example, a microcomputer, and generates a sampling signal of an A/D converter 108 described later, based on the 0th-order light received by the light receiving unit 8. Then, the measurement timing signal generation unit 9 transmits the generated sampling signal to the optical spectrum signal detection unit 10 described later.

Figure 6:
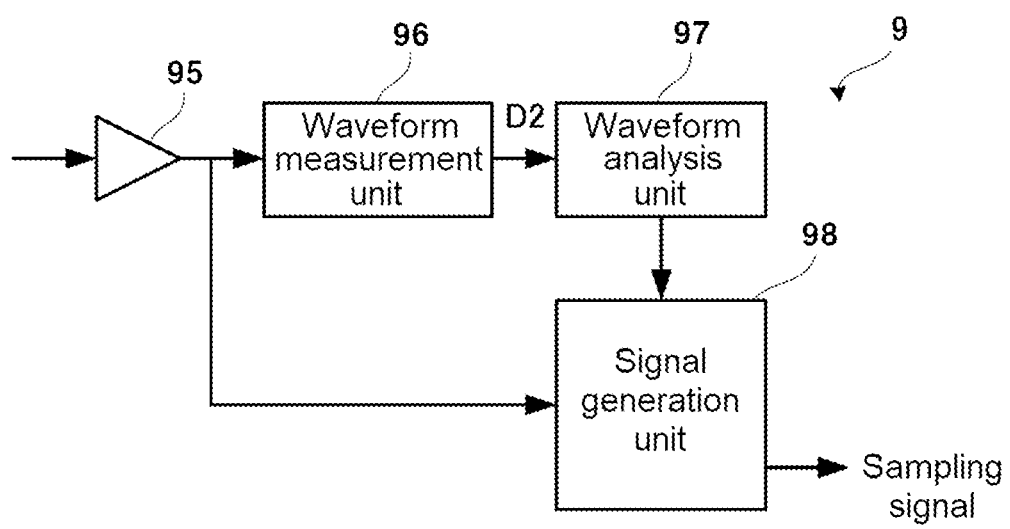
FIG. 6 is a configuration diagram illustrating a measurement timing signal generation unit in the second embodiment.

As illustrated in FIG. 6, the measurement timing signal generation unit 9 includes a signal amplifier 95, a waveform measurement unit 96, a waveform analysis unit 97, and a signal generation unit 98. The signal amplifier 95 amplifies the signal of the 0th-order light that has been received and then photoelectrically converted by the light receiving unit 8. The waveform measurement unit 96 repeatedly samples the amplified signal of the 0th-order light at regular intervals and sequentially acquires an optical power measurement value for each time. The sampling frequency in this case is, for example, 1 MHz. That is, the signal level of the 0th-order light photoelectrically converted by the light receiving unit 8 is sampled every 1 μsec in the sampling circuit in the waveform measurement unit 96, and a digital value obtained by an A/D converter in the waveform measurement unit 96 converting the signal level is input to the waveform analysis unit 97. Thus, by repeating sampling 1000 times in a cycle of, for example, 1 μsec, data D2 of the optical power measurement values of 1000 points in a time axis direction can be input to the waveform analysis unit 97.

The waveform analysis unit 97 obtains a peak timing, an off-to-on rising timing, and an on-to-off falling timing of the pulse-modulated light DUT, based on the data of the optical power measurement value for each time. That is, since the data D2 of the optical power measurement value for each time, which is obtained by the waveform measurement unit 96, represents the waveform of the pulse-modulated light DUT as illustrated in FIG. 2, for example, it is possible to detect the peak timing, the rising timing, and the falling timing, and the like of the pulse-modulated light DUT, based on such a waveform.

Then, the signal generation unit 98 can perform switching between a peak measurement mode and a normal measurement mode. In the peak measurement mode, the signal generation unit 98 generates a sampling signal based on the rising timing, the falling timing, the pulse-on time Ton, and the pulse period Tp detected by the waveform analysis unit 97. The signal generation unit 98 generates the sampling signal having a Hi level at a predetermined cycle in the normal measurement mode.

Figure 5:
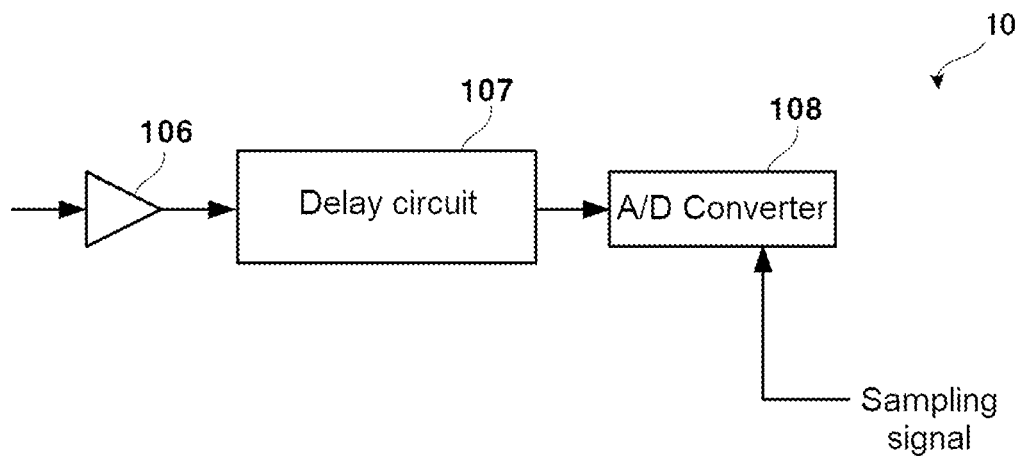
FIG. 5 is a configuration diagram illustrating an optical spectrum signal detection unit according to a second embodiment.

The optical spectrum signal detection unit 10 measures the spectrum from the nth-order light received by the light receiving unit 7. As illustrated in FIG. 5, the optical spectrum signal detection unit 10 includes a signal amplifier 106, a delay circuit 107, and an A/D converter (sampling unit) 108. The signal amplifier 106 amplifies the signal of the nth-order light that has been received by the light receiving unit 7 and then photoelectrically converted. The delay circuit 107 delays the signal of the nth-order light, which has been amplified by the signal amplifier 106. Each time the sampling signal is input, the A/D converter 108 performs analog-to-digital conversion by sampling the delayed signal of the nth-order light.

A timing at which the measurement timing signal generation unit 9 detects the peak timing based on the 0th-order light and outputs a sampling signal synchronized with the peak timing is delayed in comparison to the timing at which the nth-order light received by the light receiving unit 7 becomes a peak. In the present embodiment, the delay circuit 107 delays the signal of the nth-order light so that the nth-order light also becomes a peak at the timing when the sampling signal is output.

Next, the operation of the optical spectrum analyzer OSA having the above-described configuration will be described. In the peak measurement mode, the measurement timing signal generation unit 9 generates the sampling signal synchronized with the peak timing. Thus, it is possible to sample the signal of the nth-order light by the A/D converter 108 at the peak timing at which the pulse-modulated light DUT becomes a peak, and to detect the optical peak level of the nth-order light. In the peak measurement mode, when the corner mirror 4 is rotated to sequentially switch the wavelengths incident on the condenser 5, the optical spectrum signal detection unit 10 can detect the optical peak level for each wavelength.

Further, in the normal measurement mode, the measurement timing signal generation unit 9 generates the above-described sampling signal which becomes the Hi level at a predetermined cycle. Thus, it is possible to detect the optical level of the nth-order light of the DUT by the A/D converter 108. In the normal measurement mode, when the corner mirror 4 is rotated to sequentially switch the wavelength incident on the condenser 5, the optical spectrum signal detection unit 10 can acquire data of the optical power distribution on a frequency axis. Further, the optical spectrum signal detection unit 10 can acquire the emission wavelength and the spectrum width of the DUT from the optical power distribution.

According to the above-described embodiment, the measurement timing signal generation unit 9 samples the diffracted light of the nth order at the peak timing of the 0th-order light. Thus, even when the pulse-on time and the pulse period of the pulse-modulated light DUT are unknown, it is possible to measure the optical peak level for each wavelength of the pulse-modulated light DUT.

Further, according to the above-described embodiment, the A/D converter 108 samples the nth-order light delayed by the delay circuit 107. Thus, it is possible to bring the timing at which the measurement timing signal generation unit 9 outputs the sampling signal and the timing at which the signal of the nth-order light delayed by the delay circuit 107 becomes a peak, close to each other, and to accurately measure the optical peak level of the pulse-modulated light DUT for each wavelength.

According to the above-described embodiment, the nth-order light diffracted again by the diffraction grating 3 is incident on the light receiving unit 7, and the 0th-order light first diffracted by the diffraction grating 3 is incident on the light receiving unit 8. Thus, the light receiving unit 8 can receive the 0th-order light while the light receiving unit 7 receives the nth-order light.

The present invention is not limited to the above-described embodiment, and can be appropriately modified, improved, and the like. In addition, the material, shape, dimensions, number, arrangement location, and the like of each component in the above-described embodiment have any values as long as the present invention can be achieved, and are not limited.

According to the above-described embodiment, the 0th-order light diffracted first by the diffraction grating 3 is incident on the light receiving unit 8, but the light receiving unit 8 is not limited to this. The light receiving unit 7 may function as a first light receiving unit and a second light receiving unit so that the 0th-order light is incident on the light receiving unit 7. In this case, the 0th-order light is first incident on the light receiving unit 7, the peak timing, the pulse-on time Ton, and the pulse period Tp are obtained, and then the nth-order light is incident on the light receiving unit 7.

DESCRIPTION OF REFERENCE NUMERALS AND SIGNS

3 Diffraction grating
4 Corner mirror (return mirror)
8 Light receiving unit (first light receiving unit)
9 Measurement timing signal generation unit (timing determination unit)
102 Peak hold circuit
103 A/D converter (sampling unit)
104 Switch (switching unit)
107 Delay circuit
108 A/D converter (sampling unit)
DUT Pulse modulated light
OSA Optical spectrum analyzer

What is claimed is:

1. An optical spectrum analyzer that measures pulse-modulated light, the analyzer comprising:
    a diffraction grating on which the pulse-modulated light is incident;
    a first light receiver configured to receive 0th-order light diffracted by the diffraction grating;
    a second light receiver configured to receive diffracted light of an order other than the 0th-order light;
    a measurement timing signal generation circuit configured to generate a sampling signal based on a pulse characteristic of the 0th-order light received by the first light receiver; and
    an optical spectrum signal detector configured to measure a spectrum of the diffracted light received by the second light receiver based on the sampling signal generated by the measurement timing signal generation circuit.

2. The optical spectrum analyzer according to claim 1, wherein:
    the measurement timing signal generation circuit is configured to determine a hold timing, a reset timing, and a sampling timing based on the 0th-order light received by the first light receiver, and
    the optical spectrum analyzer further comprises:
        a peak hold circuit configured to hold a peak of the diffracted light of the order other than the 0th-order light, which is received by the second light receiver during a period from the hold timing to the reset timing, and a sampling circuit configured to sample the peak held by the peak hold circuit in accordance with the sampling timing.

3. The optical spectrum analyzer according to claim 2, further comprising:

a switch configured to switch an input to the sampling circuit between the peak hold circuit and the second light receiver.

4. The optical spectrum analyzer according to claim 2, further comprising:

a return mirror on which the diffracted light from the diffraction grating is incident and reflected again toward the diffraction grating, wherein the first light receiver configured to receive the 0th-order light diffracted first by the diffraction grating, and the second light receiver configured to receive the diffracted light of the order other than the 0th-order light diffracted again by the diffraction grating.

5. A pulse-modulated light measurement method, the method comprising:

causing a pulse-modulated light to be incident on a diffraction grating to emit diffracted light;

determining a hold timing, a reset timing, and a sampling timing based on 0th-order light of the diffracted light;

holding a peak of the diffracted light of an order other than the 0th-order light during a period from the hold timing to the reset timing; and sampling the peak in accordance with the sampling timing.

6. The optical spectrum analyzer according to claim 1, wherein:

the measurement timing signal generation circuit is configured to detect a peak timing at which the 0th-order light received by the first light receiver becomes a peak, and the optical spectrum analyzer further comprises:

a sampling circuit configured to sample the diffracted light of the order other than the 0th-order light, which is received by the second light receiver, at the peak timing.

7. The optical spectrum analyzer according to claim 6, further comprising:

a delay circuit configured to delay the diffracted light of the order other than the 0th-order light, which is received by the second light receiver, wherein the sampling circuit is configured to sample the diffracted light of the order other than the 0th-order light, which is delayed by the delay circuit.

8. The optical spectrum analyzer according to claim 6, further comprising:

a return mirror on which the diffracted light from the diffraction grating is incident and reflected again toward the diffraction grating, wherein the first light receiver is configured to receive the 0th-order light diffracted first by the diffraction grating, and the second light receiver is configured to receive the diffracted light of the order other than the 0th-order light diffracted again by the diffraction grating.

9. A pulse-modulated light measurement method, the method comprising:

causing a pulse-modulated light to be incident on a diffraction grating to emit diffracted light;

detecting a peak timing of 0th-order light of the diffracted light; and sampling diffracted light of an order other than the 0th-order light at the detected peak timing.

* * * * *